(12) United States Patent
Lalancette

(10) Patent No.: US 7,628,286 B2
(45) Date of Patent: Dec. 8, 2009

(54) ELECTRICAL OUTLET BOX ASSEMBLY FOR ADJUSTABLE POSITIONING WITH RESPECT TO A STUD

(75) Inventor: Daniel Lalancette, L'Acadie (CA)

(73) Assignee: Thomas & Betts International, Inc., Wilmington, DE (US)

( * ) Notice: Subject to any disclaimer, the term of this patent is extended or adjusted under 35 U.S.C. 154(b) by 661 days.

(21) Appl. No.: 11/263,688

(22) Filed: Nov. 1, 2005

(65) Prior Publication Data

US 2006/0108362 A1    May 25, 2006

Related U.S. Application Data

(60) Provisional application No. 60/630,005, filed on Nov. 22, 2004.

(51) Int. Cl.
*H02G 3/08* (2006.01)
*H02G 3/16* (2006.01)

(52) U.S. Cl. ............... 220/3.7; 220/3.92; 220/3.9; 220/3.6

(58) Field of Classification Search ......... 220/3.2–3.94; 174/17 R
See application file for complete search history.

(56) References Cited

U.S. PATENT DOCUMENTS

| | | | | | |
|---|---|---|---|---|---|
| 876,187 | A | * | 1/1908 | Hornsby | 220/3.5 |
| 1,113,092 | A | * | 10/1914 | Beugler | 220/3.5 |
| 1,133,946 | A | * | 3/1915 | Farrell | 220/3.4 |
| 1,275,692 | A | * | 8/1918 | Hubbell | 220/3.7 |
| 1,275,725 | A | * | 8/1918 | Newton | 220/3.7 |
| 1,774,934 | A | * | 9/1930 | Mangin | 220/3.92 |
| 1,774,935 | A | * | 9/1930 | Mangin | 174/63 |
| 1,814,449 | A | * | 7/1931 | Morgenstern | 220/3.9 |
| 1,983,670 | A | * | 12/1934 | Knight | 248/228.3 |
| 2,032,636 | A | * | 3/1936 | Seckinger | 220/3.9 |
| 2,272,846 | A | * | 2/1942 | Lindstrom | 220/3.6 |
| 2,286,898 | A | * | 6/1942 | Cover | 220/3.6 |
| 2,374,622 | A | * | 4/1945 | Rugg | 174/58 |
| 2,422,847 | A | * | 6/1947 | Peter | 362/133 |
| 2,432,555 | A | | 12/1947 | Smith | |
| 2,473,051 | A | | 6/1949 | Carlson | |
| 2,512,188 | A | | 6/1950 | Wait et al. | |
| 2,605,923 | A | * | 8/1952 | Bergquist | 220/3.9 |
| 2,917,199 | A | * | 12/1959 | Appleton | 220/3.7 |
| 3,115,265 | A | * | 12/1963 | Mulkey et. al. | 220/3.5 |
| 3,148,698 | A | * | 9/1964 | Arnold | 137/360 |
| 3,365,156 | A | * | 1/1968 | Beck | 248/205.1 |
| 3,633,782 | A | | 1/1972 | Bellinger | |
| 3,767,151 | A | | 10/1973 | Seal et al. | |
| 3,834,658 | A | | 9/1974 | Theodorides | |
| 4,057,164 | A | | 11/1977 | Maier | |
| 4,062,470 | A | * | 12/1977 | Boteler | 220/3.3 |
| 4,732,356 | A | | 3/1988 | Medlin, Sr. | |

(Continued)

*Primary Examiner*—Anthony Stashick
*Assistant Examiner*—Ned A Walker
(74) *Attorney, Agent, or Firm*—Hoffmann & Baron, LLP

(57) ABSTRACT

The present invention is directed to an electrical outlet box assembly for adjustable positioning with respect to a wall stud. An electrical outlet box includes plural side walls defining a box interior having an open front face. A box locator is adjustably positioned on one of the side walls so as to adjust the location of the front face with respect to the stud to which the box locator is mounted. A support bracket is adjustably attached to another of the side walls for supporting the adjustably positioned box with respect to the back wall board.

7 Claims, 4 Drawing Sheets

U.S. PATENT DOCUMENTS

| | | |
|---|---|---|
| 4,898,357 A | 2/1990 | Jorgensen et al. |
| 4,964,525 A | 10/1990 | Coffey et al. |
| 4,978,092 A | 12/1990 | Nattel |
| 5,031,789 A | 7/1991 | Dauberger |
| 5,253,831 A | 10/1993 | Theodorides |
| 5,289,934 A | 3/1994 | Smith et al. |
| RE34,786 E | 11/1994 | Slough |
| 5,378,854 A * | 1/1995 | Hoover .................. 174/53 |
| 5,596,174 A * | 1/1997 | Sapienza ................ 174/57 |
| 5,603,424 A * | 2/1997 | Bordwell et al. ......... 220/3.5 |
| 5,646,371 A | 7/1997 | Fabian |
| 6,218,615 B1 * | 4/2001 | Canonico ................ 174/50 |
| 6,749,162 B2 * | 6/2004 | Nicolides et al. ........ 248/231.9 |
| 6,765,146 B1 * | 7/2004 | Gerardo ................. 174/58 |
| 6,903,272 B2 * | 6/2005 | Dinh .................... 174/58 |
| 6,956,172 B2 * | 10/2005 | Dinh .................... 174/58 |
| 6,979,780 B1 * | 12/2005 | Lalancette .............. 174/50 |
| 7,082,728 B1 * | 8/2006 | McConaughy et al. ..... 52/220.1 |
| 7,141,736 B2 * | 11/2006 | Plankell ................ 174/50 |
| 7,271,335 B2 * | 9/2007 | Dinh .................... 174/58 |
| 2003/0024725 A1 * | 2/2003 | Lalancette et al. ....... 174/58 |
| 2004/0045960 A1 * | 3/2004 | Rose .................... 220/3.9 |

* cited by examiner

ELECTRICAL OUTLET BOX ASSEMBLY FOR ADJUSTABLE POSITIONING WITH RESPECT TO A STUD

CROSS-REFERENCE TO RELATED APPLICATIONS

This application claims priority to U.S. Provisional Application No. 60/630,005 filed Nov. 22, 2004.

FIELD OF THE INVENTION

The present invention relates generally to an electrical outlet box mounted to a wall stud. More particularly the present invention relates to an electrical outlet box which may be adjustably mounted to the wall stud so as to accurately position the outlet box with respect to the wall stud.

BACKGROUND OF THE INVENTION

Electrical outlet boxes are widely used to house electrical components such as switches and receptacles for termination of electrical wires run through the wall of a structure. Typically, these electrical outlet boxes are mounted to a wall stud supporting structural wall board. In new construction, the outlet box is mounted to the wall stud prior to attachment of the wall board. Thus, the outlet box must be properly positioned with respect to the stud so that the front face of the outlet box is aligned with the front of the wall board once it is placed against the stud. Such positioning of the box must be taken into consideration for the various thickness and layers of wall board.

In addition to such accurate mounting, subsequent electrical termination of the switches and receptacles in the box may cause the box to be moved or displaced once secured. In certain situations, there may be a tendency for the electrical installer to push the box inwardly into the wall cavity rendering the box useless.

The art has seen a number of brackets which are used in combination with stud mounted electrical boxes to both accurately align the front face of the outlet box with respect to the wall board and to prevent the box from being pushed into the wall cavity.

U.S. Pat. No. 4,978,092 shows an adjustable support bracket that prevents the box from being pushed into the wall cavity.

U.S. Pat. No. 2,473,051 also shows a box having an adjustable support preventing the box from being pushed into the cavity.

U.S. Pat. Nos. 5,289,934, 5,253,831 and 3,834,658 show adjustable stud mounted brackets which allow the box to be adjustably positioned with respect to the wall stud.

None of the prior art devices, however, allow both for adjustment of the box once the box is attached to the wall stud, as well as providing separate independent structure to prevent the adjusted box from being pushed into the wall cavity.

SUMMARY OF THE INVENTION

The present invention provides an electrical outlet box assembly for adjustable positioning with respect to a wall stud. An electrical outlet box includes plural side walls defining a box interior having an open front face. A box locator is adjustably positioned on one of the side walls. The box locator includes a mounting surface parallel to the open front face of the box and an attachment surface perpendicular thereto. The attachment surface is adjustably positioned along one of the side walls so as to adjust the location of the front face with respect to the stud to which the box locator is mounted. The attachment surface is fixable to the side wall upon adjustable positioning of the front face of the box. A support bracket is provided. The support bracket is adjustably attached to another of the side walls for supporting the adjustably positioned box with respect to the back wall board.

DETAILED DESCRIPTION OF THE PREFERRED EMBODIMENT

The present invention provides an electrical outlet box for supporting electrical components such as switches and receptacles (not shown). In conventional fashion, the stripped ends of insulated wires (not shown) are run into the box so as to be terminated to the components mounted within the box. The box itself is designed to be secured to a wall stud such that when wall board is placed over the wall stud, the front face of the box is positioned generally flush thereto.

Figure 1:
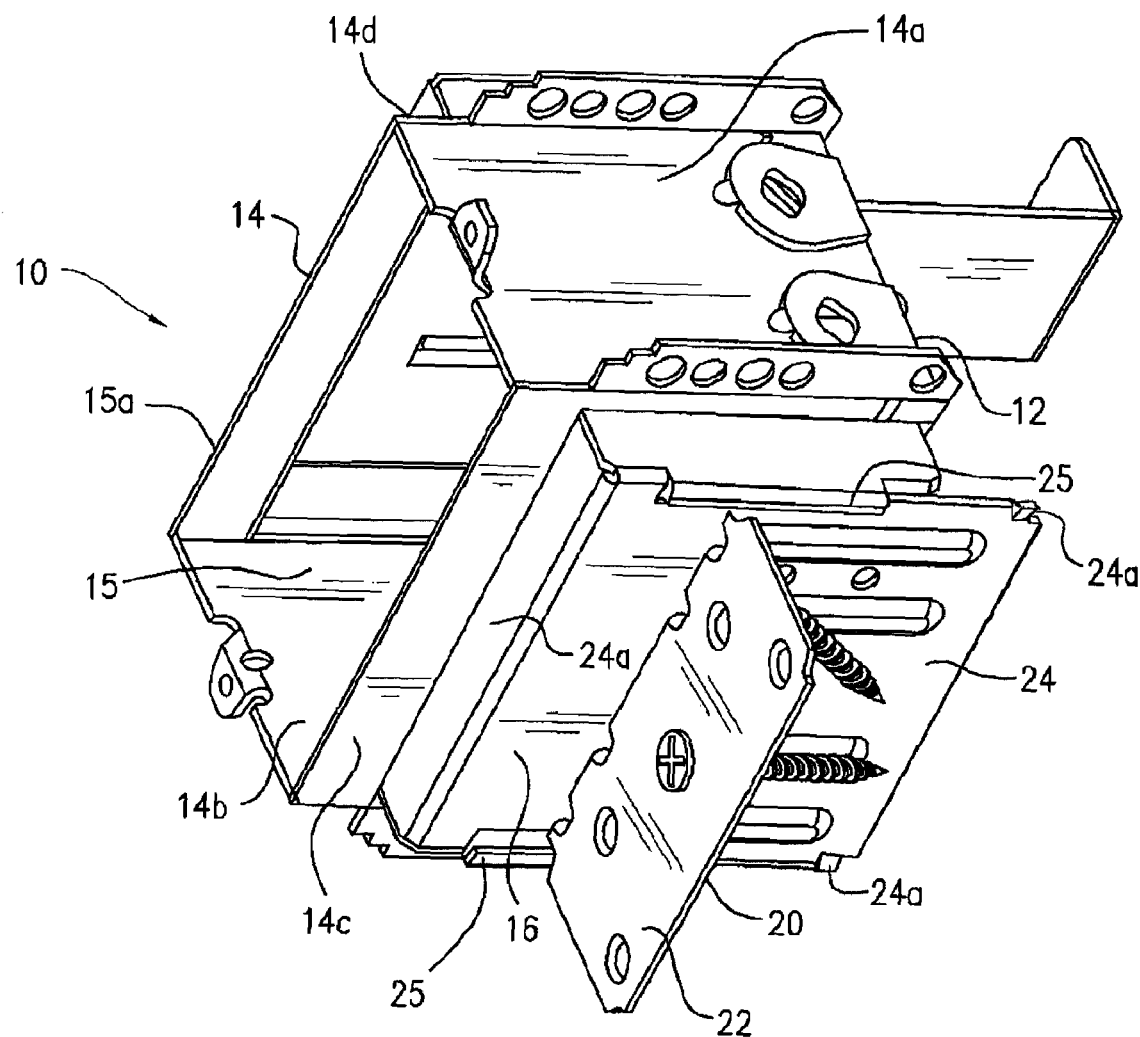
FIGS. 1 and 2 are perspective opposite side showings of adjustable electrical outlet box of the present invention.
Figure 2:
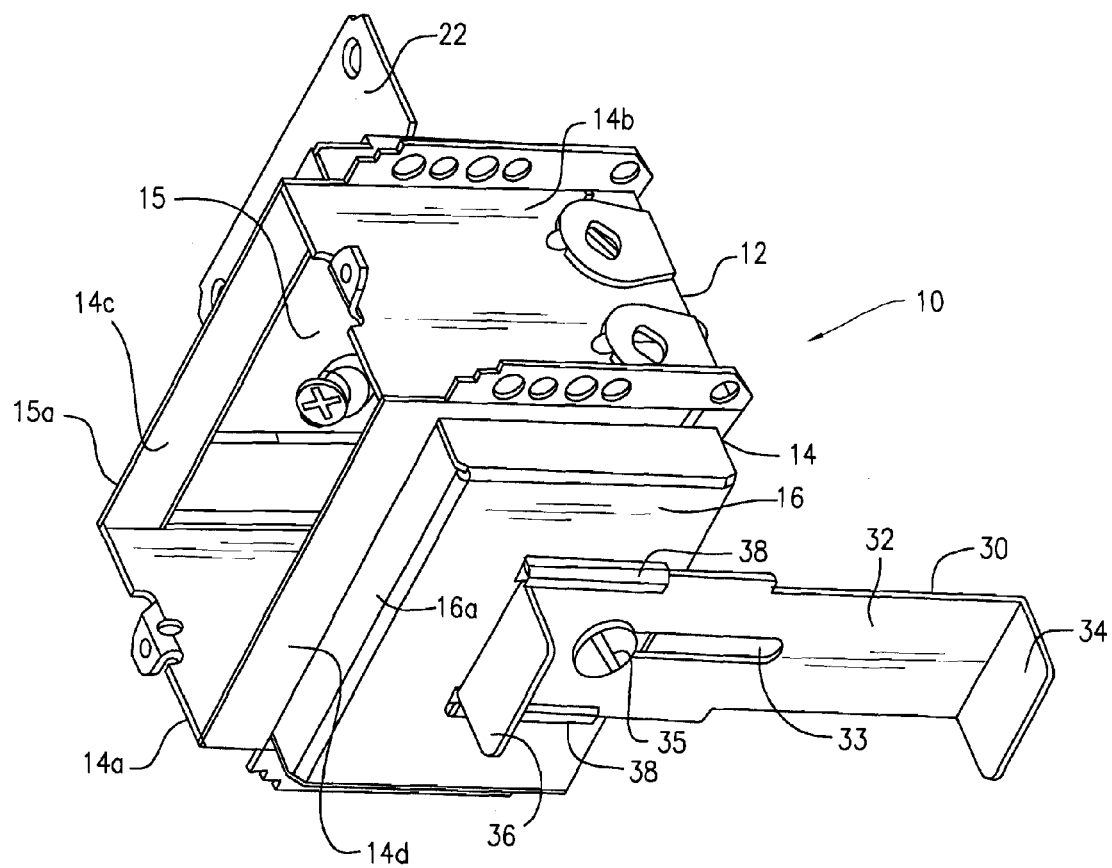

Referring now to FIGS. 1 and 2, the electrical outlet box 10 of the present invention is shown. Box 10 includes a back wall 12, perimetrical side 14 including top and bottom walls 14a and 14b and opposed lateral side walls 14c and 14d. The box defines a box interior 15 where the components are terminated and supported. Each of the side walls 14c and 14d includes an extending compartment 16 so as to increase the interior volume of box 10.

The extending compartments 16 define extending forward surfaces 16a which are generally parallel to the open front face 15a of box 10. As will be described in further detail herein below, the surfaces 16a are used to support wall board so that the front face 15a of the box may be positioned flush thereto.

Referring specifically to FIG. 1, box 10 includes an adjustable box locator 20 which is slidably attached to the side of compartment 16. The box locator 20 is generally a right angled member having a mounting surface 22 positioned generally parallel to front face 15a and an attachment surface 24 perpendicular thereto. The attachment surface 24 is held to compartment 16 by a pair of rails 25 which slidably accommodate attachment surface 24. The distal edges of attachment surface 24 may include protrusions 24a to prevent dislodgement of the locator from the box. The box locator 20 allows the box 10 to be adjustably positioned with respect to a wall stud as will be described in further detail herein below.

Referring now to FIG. 2, a support bracket 30 is adjustably attached to compartment 16 on the opposite side wall 14d of box 10. Support bracket 30 includes an elongate body 32 having right angled stop members 34 and 36 extending from the ends thereof. Body 32 has a central elongate slot 33 through which an attachment screw 35 extends so as to attach the support bracket to the compartment 16. The box is slidably coupled to compartment 16 by a pair of rails 38 so that the support bracket 30 can be slidably adjustably positioned along compartment 16. As will be described in further detail herein below, the support bracket 30 is adjustably positioned so that stop 36 abuts against the inside of wall board and stop 34 is positioned adjacent the opposed wall board to prevent the box from being pushed into the wall during use.

Figure 3:
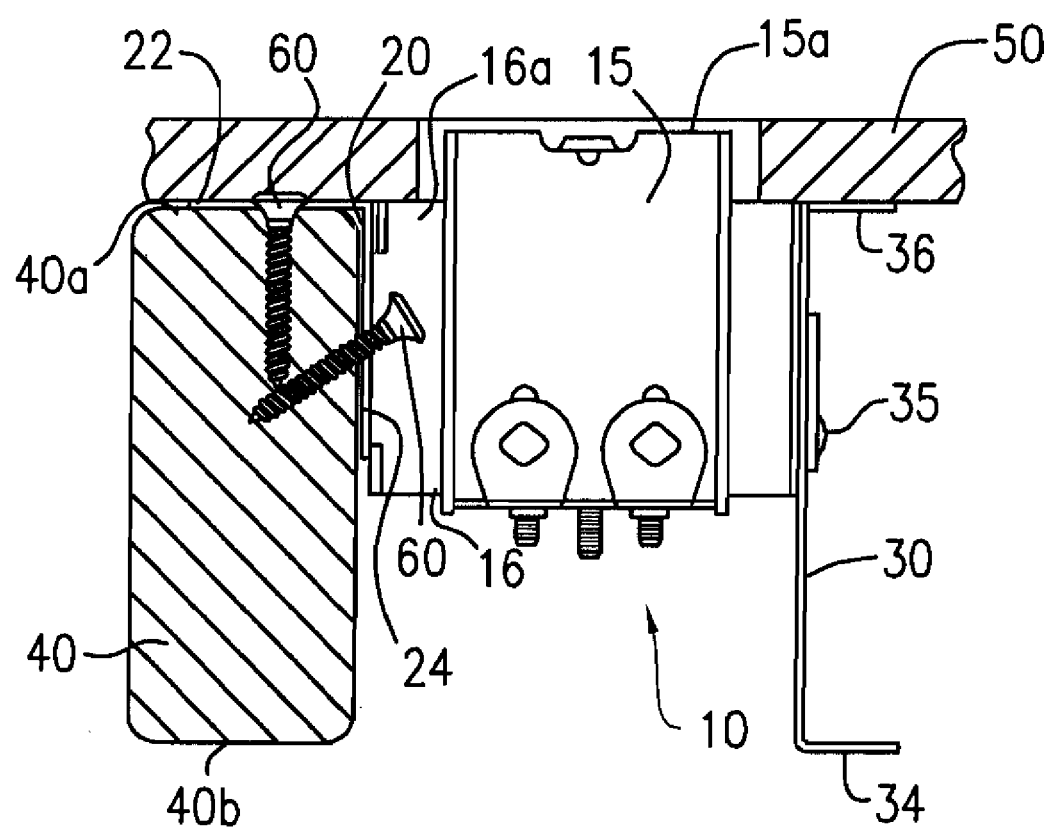
FIGS. 3-5 show the adjustable electrical outlet box of FIG. 1 accommodating various thicknesses and numbers of wall board.
Figure 4:
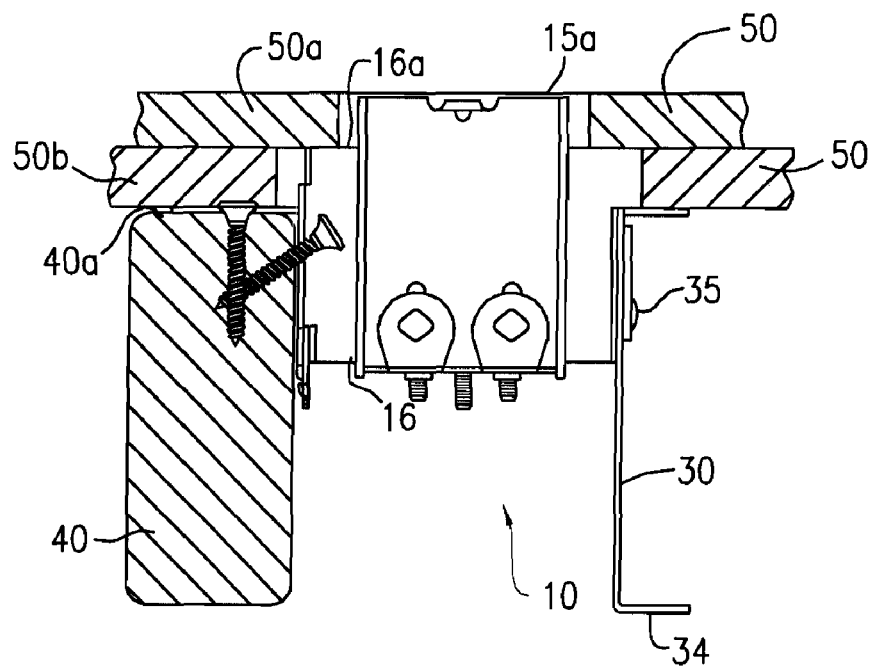
Figure 5:
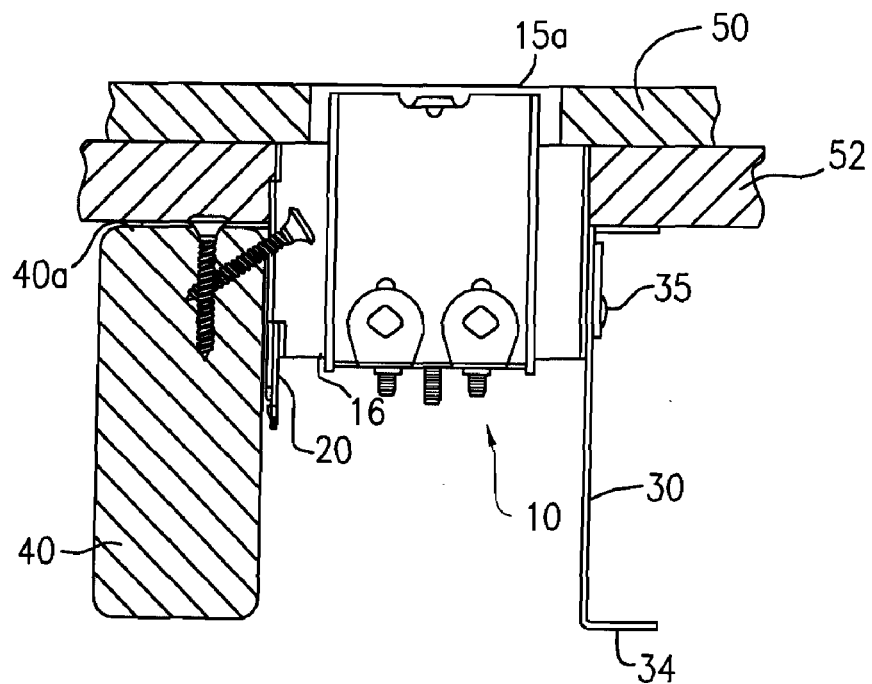

Having described the components of the adjustable box of the present invention, its use may be described with respect to FIGS. 3-5.

As shown in FIG. 3, the box 10 of the present invention may be supported to a wall stud 40 in such a manner that it accommodates a single thickness of ½" wall board 50. The box is installed on the stud in the following manner. The mounting surface 22 of box locator 20 is secured to the face 40a of the stud using a conventional mounting screw 60. The box 10 is then adjustably positioned by slidable movement of the box with respect to the locator 20 such that the front face 15a of the box extends approximately 7/16" from the face 40a of the stud. Once the box is properly positioned, a second screw 60 may be installed through the interior 15 of the box and through the attachment surface 24 to fix the position of the box with respect to the stud. The wall board 50 may now be attached to the stud 40. A ledge 16a formed by compartment 16 serves to seat the wall board 50. In this position, the front face 15a of the box is fixed at a position nearly flush with the wall board. Once the position of the front face of the box is fixed, support bracket 30 may be slidably positioned with respect to wall board 50. The attachment screw 35 is loosened so that the support bracket 30 can be slidably adjustably positioned along the box. The bracket 30 is positioned such that stop 36 is slidably positioned against wall board 50. The length of the support member is selected such that when properly positioned, the opposite stop 34 will be positioned next adjacent the wall board (not shown) which is attached to the opposite face 40b of stud 40. In this manner, during use and installation, and subsequently upon reattachment of components to box 10, the box will not be pushed into the wall.

FIG. 4 shows a similar mounting technique for box 10 employed with two layers of ½" wall board 50. In this embodiment, the box 10 is adjusted such that the front face 15a thereof is aligned substantially flush with the outer wall board surface at a distance of approximately 15/16" from face 40a of stud 40. The wall boards 50a and 50b are attached to the stud 40 such that the outer wall board 50a is positioned over ledge 16a of compartment 16 while the inner wall board 50b is positioned rearwardly and to the side of compartment 16. The bracket 30 is adjusted so that the stop 36 abuts against the inner surface of wall board 50b. In this position, opposed stop 34 abuts against the wall board attached to the face 40b of stud 40 to prevent the box from being inadvertently pushed into the wall during use.

As shown in FIG. 5, box 10 may also be used to accommodate multiple layers of different thicknesses of wall board. For example, in FIG. 5, wall board 50 which is ½" wall board is combined with wall board 52 which is ¾" wall board. In this embodiment, the front face 15a of box 15 is positioned approximately 15/16" from the face 40a of stud 40. The adjustable positioning of both the box locator 20 and the support bracket 30 accommodate this combination by adjustment in a manner similar to that described with respect to FIGS. 3 and 4.

Furthermore, it is contemplated that the present invention can be used with a variety of wall board thicknesses as well as a variety of multiples of wall board layer. In each case, the box is adjustably positioned with respect to box locator 20 so as to position the front face 15a of box 10 substantially flush with the outer surface of the wall board. In the same manner, support bracket 30 can be adjustably positioned so as to prevent the box during use from being pushed into the wall.

What is claimed is:

1. An electrical outlet box assembly for adjustable positioning with respect to a wall stud comprising:
    an electrical outlet box having a back wall, a pair of opposed bottom walls and a pair of opposed side walls;
    an extending compartment attached to each of said pair of opposed side walls defining first extending compartment and second extending compartment;
    an adjustable box locator slidably attached to said first extending compartment, a mounting screw extending through said first extending compartment and said adjustable box locator for attachment of said electrical outlet box to said stud; and
    a support bracket adjustably attached to said second extending compartment, said support bracket is U-shaped including one side adjacent to said second extending compartment and two sides extending perpendicular to said one side to provide support of said electrical box preventing said electrical box from being pushed into a wall.

2. An electrical outlet box assembly of claim 1 wherein said box locator is a right angled member having an attachment surface and a mounting surface perpendicular thereto, said attachment surface is slidably attached to said first extending compartment.

3. An electrical outlet box assembly of claim 2, wherein said first extending compartment further including a pair of rails which slidably attaches said first extending compartment to said box locator.

4. An electrical outlet box assembly of claim 3, wherein said attachment surface of said box locator further includes protrusions to prevent dislodgment of the box locator from said pair of rails.

5. An electrical outlet box assembly of claim 4, wherein said support bracket includes a pair of opposed right angled stop members and an elongated body therebetween.

6. An electrical outlet box assembly of claim 5, wherein said elongated body having a central elongated slot and an attachment screw therethrough to attach said support bracket to said second extending compartment.

7. An electrical outlet box assembly for adjustable positioning with respect to a wail stud comprising:
    an electrical outlet box having a back wail and a pair of opposed side walls;
    an extending compartment attached to each of said pair of opposed side walls defining first extending compartment and second extending compartment;
    an adjustable box locator having an attachment surface and a mounting surface perpendicular to said attachment surface, said attachment surface is slidably attached to said first extending compartment, said first extending compartment further including a pair of rails which slidably attaches said first extending compartment to said box locator, said attachment surface of said box locator further includes protrusions to prevent dislodgment of the box locator from said pair of rails; and
    a support bracket includes a pair of opposed right angled stop members and an elongated body therebetween; said elongate body having a central elongated slot and an attachment screw therethrough to adjustably attach said support bracket to said second extending compartment. said second extending compartment farther including a pair of rails to engage with said support bracket providing adjustable attachment thereto.

\* \* \* \* \*

UNITED STATES PATENT AND TRADEMARK OFFICE
CERTIFICATE OF CORRECTION

| | | |
|---|---|---|
| PATENT NO. | : 7,628,286 B2 | Page 1 of 1 |
| APPLICATION NO. | : 11/263688 | |
| DATED | : December 8, 2009 | |
| INVENTOR(S) | : Daniel Lalancette | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1044 days.

Signed and Sealed this

Second Day of November, 2010

David J. Kappos
*Director of the United States Patent and Trademark Office*